Aug. 25, 1970 W. H. AINCHAM 3,525,441

CHIP HOLDER

Filed Jan. 8, 1969

Inventor:
William H. Aincham
By: Snow and Benno
Attys.

United States Patent Office 3,525,441
Patented Aug. 25, 1970

3,525,441

CHIP HOLDER

William H. Aincham, 3 S. York Road, Bensenville, Ill. 60106

Filed Jan. 8, 1969, Ser. No. 789,899
Int. Cl. A47f 7/00
U.S. Cl. 211—49 4 Claims

ABSTRACT OF THE DISCLOSURE

A chip holder carrying chips on a star shaped base in vertical stacks with confinement by a plurality of posts against lateral shifting movement and against vertical movement by a top plate which is removably fastened to the base by centrally disposed cooperative fastener elements. When the top plate is removed the chips can be easily removed or replaced and conversely when the top plate is in fixed position the chips are securely locked in the chip holder.

This invention relates to a new and improved chip holder.

A principal object of this invention is to provide a novel holder for chips such as used in conjunction with card games.

An important object of this invention is to provide a novel holder for chips which is compact and light in weight for easy handling and yet carries a large number of chips.

Another important object of this invention is to provide a novel holder for chips in which the chips are visible and yet are confined against accidental displacement regardless of how the chip holder might be handled or turned.

Still another important object of this invention is to provide a novel holder of stacks of chips as defined in the preceding object and including a quickly removable top plate to expose the stacks of chips for use during play of a game.

Another and still further important object of this invention is to provide a novel holder of stacks of chips on a base as defined in the preceding two objects and including finger engaging notches in the base beneath each stack of chips to facilitate removal of the chips from the holder.

Another important object of this invention is to provide a novel combination chip and card holder which securely holds the chips and cards during non-use but quickly makes the chips and cards available when their use is desired.

Still another important object of this invention is the provision of novel means in a chip holder for removably fastening a top plate in spaced above position relative to a base for holding stacks of chips therebetween.

Another important object of this invention is to provide a novel chip holder as defined in the preceding object and including means for snuggly gripping decks of cards on the top side of the top plate.

Other and further important objects and advantages will become apparent from the disclosures in the following specification and accompanying drawings.

Figures 1, 2, 3, 4:
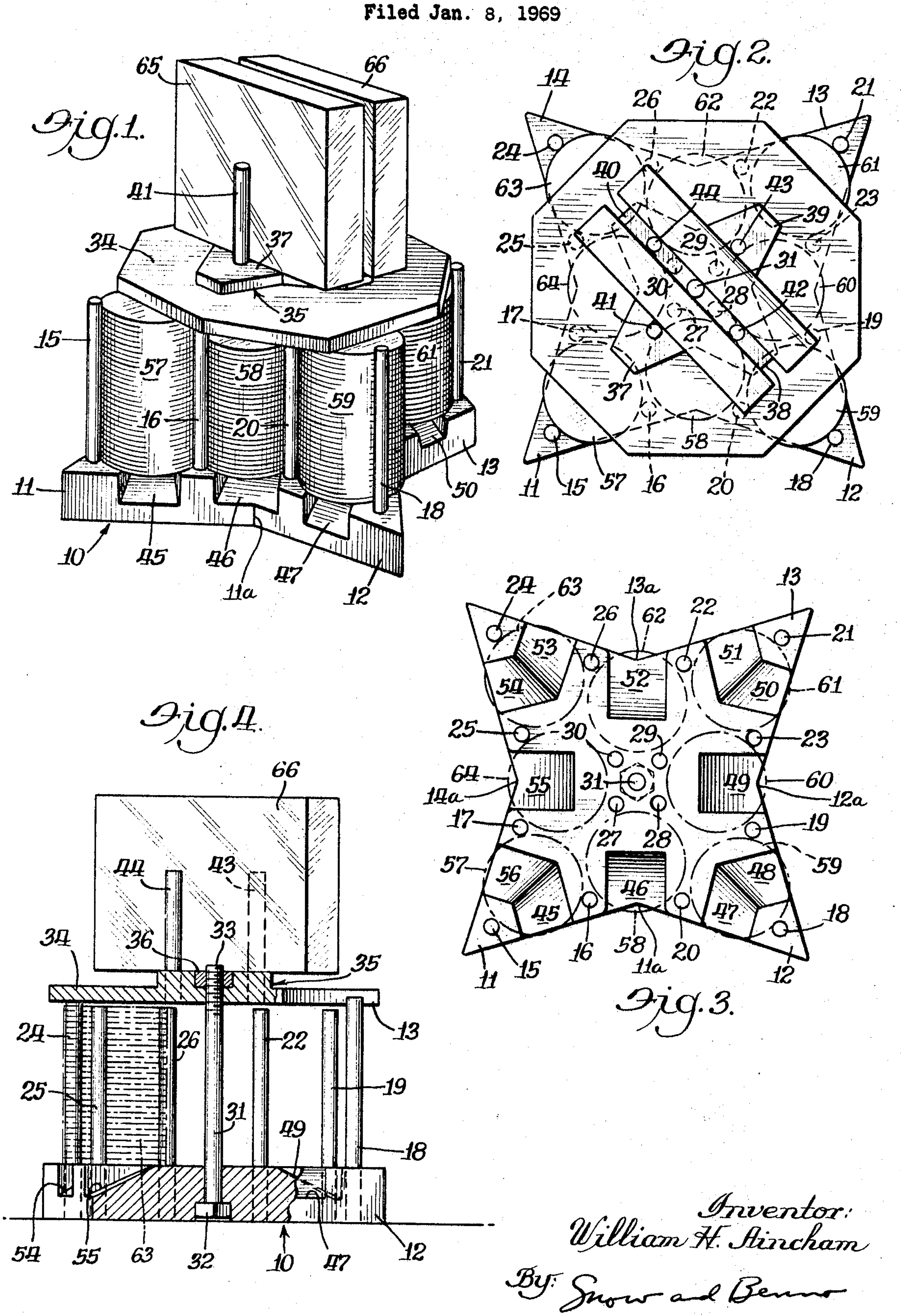
FIG. 1 is a perspective view of the chip holder of this invention.
FIG. 2 is a top plan view of the device of FIG. 1.
FIG. 3 is a view similar to FIG. 2 with the top plate of the device removed to show the interior.
FIG. 4 is a side elevational view of the chip holder of this invention with portions broken away to show interior construction.

The reference numeral 10 indicates generally a base which has a plan view shape of a four pointed star. We are defining the shape as a star because it most nearly resembles a star although it conceivably could be termed a cross. The tapered points of the star shaped base are shown at 11, 12, 13 and 14. Each point has diverging sides which join adjacent diverging sides of other points in crotches or roots of the star as shown at 11*a*, 12*a*, 13*a* and 14*a*. It is around this base at each point and each crotch that vertical stacks of chips are placed and held.

A plurality of vertical posts have their lower ends affixed to the base and are arranged in a manner to individually confine each stack of chips. Point 11 of the star shaped base 10 has a post 15 at its apex and posts 16 and 17 are positioned outwardly on each diverging side of the point in the general outline shape of an equilateral triangle. Similarly base point 12 has an apex post 18 and diverging side posts 19 and 20. Base point 13 has an apex post 21 and diverging side posts 22 and 23. Base point 14 has an apex post 24 and diverging side posts 25 and 26. Posts 27, 28, 29 and 30 are located about the general center of the base 10 in the arrangement of a small square.

A vertically disposed fastener 31, here shown as a bolt, is preferably located on the center of the base 10 within the small square arrangement of posts 27, 28, 29 and 30. The lower end of the fastener, here shown as a bolt head 32, is fixedly secured in the base 10. The upper end of the fastener 31 is provided with engaging means such as the threads 33 as shown.

A top plate 34 is shown as octagonally shaped but conceivably could be other shapes and still function as desired. The top plate 34 has less lateral extent than the points of the star shaped base so that each of the vertical posts 15, 18, 21 and 24 are outside the confines of the top plate when that plate is centered over the base 10. The top plate has a cross shaped cap 35 superposed on the central portion thereof. A cooperative fastening means such as a nut 36 is embedded in the top plate and its cross shaped cap at substantially the center. The top plate with its embedded nut 36 is capable of removable attachment to the upper threaded end 33 of the elongated bolt 31. The cross shaped cap 35 has tapering arms 37, 38, 39 and 40. A vertically disposed post 41 is affixed at its lower end to the cross arm 37. Similar vertical posts 42, 43 and 44 are affixed to the cap 35 on each cross arm 38, 39 and 40 respectively.

The base 10 is provided with a downwardly and outwardly tapering finger notch on the top of the base between the posts 15 and 16. The notch 45 has a width sufficient to easily permit entrance of a person's thumb or finger but less than the diameter of a chip. Similar finger notches are provided around the base 10 at 46 between posts 16 and 20, at 47 between posts 20 and 18, at 48 between posts 18 and 19, at 49 between posts 19 and 23, at 50 between posts 23 and 21, at 51 between posts 21 and 22, at 52 between posts 22 and 26, at 53 between posts 26 and 24, at 54 between posts 24 and 25, at 55 between posts 25 and 17, and at 56 between posts 17 and 15.

The chip holder as above defined carries a plurality of playing chips in eight vertical stacks around the periphery of the star shaped base 10. A vertical stack of chips 57 is laterally confined within the triangularly disposed posts 15, 16 and 17. This stack of chips 57 may be inserted or removed from the base by a players fingers engaging the bottom of the stack by passing through either of the finger notches 45 or 56. Similar vertical stacks of chips are located around the base 10 at 58 laterally confined within the posts 16, 20, 28 and 27, at 59 laterally confined within posts 18, 19 and 20, at 60 laterally confined within posts 19, 23, 29, and 28, at 61 laterally confined within posts 21, 22 and 23, at 62 laterally confined within posts 22, 26, 30 and 29, at 63 laterally confined within posts 24, 25 and 26, and at 64 within posts 25, 17, 27 and 30. Finger access may be had to the bottom of the several vertical stacks through the various tapered notches disposed therebeneath. The stack 58 has access notch 46, the stack 59 has access notches 47 and 48, the stack 60 has access notch 49, the stack 61 has access notches 50 and 51, the stack 62 has access notch 52, the stack 63 has access notches 53 and 54, and the stack 64 has access notch 55. Stacks 57, 59, 61 and 63 are located on each star point 11, 12, 13 and 14 respectively. Stacks 58, 60, 62 and 64 are located at each star crotch 11*a*, 12*a*, 13*a* and 14*a* respectively. The stacks on the points form an outer ring of stacks while the stacks in the crotches form an inner ring of stacks.

The top plate 34 acts to keep the vertical stacks of chips in vertical confinement when it is in position spaced above the base 10 and the cooperative fastening means are in engagement. When the top plate has its embedded nut 36 threadedly engaged with the fastener bolt element 31 its under surface substantially engages the tops of the inner posts 27, 28, 29, 30, 16, 20, 19, 23, 22, 26, 25 and 17. The outer posts 15, 18, 21 and 24 which are those located on the apices of the star points are longer than the inner posts. The outer posts extend above the under surface of the top plate 34. It is the combination of the top plate 34 with the elongated posts that prevent unwarranted removal of chips regardless of the disposition of the chip holder. Despite the secure holding of the chips they are substantially exposed to view all around the holder. When it is desired to use the chips in play the top plate is rotated to cause disengagement of the cooperative fastening means and the top plate removed. The stacks may thus be engaged by a user's fingers at both the top and bottom and then removed from the holder. Conversely when it is desired to store the chips the top plate is reengaged causing the stacks of chips to be securely held in the holder.

To make the chip holder complete decks of cards 65 and 66 are held on the top side of the top plate 34 and its cross shaped cap 35. The arrangement of the posts 41, 42, 43 and 44 is such that that forms two spaced apart slots for receiving the decks of cards and snuggly holding them during storing. The post 41 engages the outside of deck 65 and the spaced apart aligned posts 42 and 44 engage the inside of the deck 65. Similarly the post 43 engages the outside of the deck 66 and the same spaced apart aligned posts 42 and 44 engage the inside of the deck 66.

I am aware that numerous details of construction of my invention can be varied throughout a wide range without departing from the principles disclosed herein.

What is claimed is:

1. A chip holder comprising a generally horizontally disposed base, a plurality of vertically disposed posts having their lower ends mounted in said base, said posts arranged on the base to confine individual stacks of chips, a generally centrally disposed vertical fastener having a lower portion secured in said base, a generally horizontally disposed top plate for said chip holder, cooperative fastening means secured in said top plate for engaging the upper end of the vertical fastener, said top plate being of less peripheral extent that the extent of the plurality of posts, certain of said posts terminating beneath said top plate and the other of said posts located around the outer periphery of the base terminating at a position above the lower level of the top plate, whereby the combination of the top plate with the outer peripheral posts act to confine the stacks of chips in the chip holder when the cooperative fastening means in the top plate is engaged with the vertical fastener.

2. A chip holder comprising a generally horizontally disposed four pointed star shaped base, a plurality of vertically disposed posts having their lower ends mounted in said base, said posts arranged on the base to laterally confine individual stacks of chips, said post arrangement including a post on the outer end of each of the four points of the star shaped base, a post on each side of the diverging points of the star shaped base, and a post at each corner of a small square about the center of the base, whereby the base may hold a stack of chips on each of the four points forming an outer ring of stacks of chips and a stack of chips at each corner of the small square of posts forming an inner ring of stacks of chips, a vertical fastener disposed centrally of the small square of posts having a lower portion secured in said base, a generally horizontally disposed top plate for said chip holder, cooperative fastening means secured in said top plate for engaging the upper end of the vertical fastener, said top plate being of less peripheral extent than the points of the base, all of said posts excepting those posts on the outer ends of the four points terminating beneath said top plate and said posts on the outer ends of the four points terminating at a position above the lower level of the top plate, whereby the combination of the top plate with the posts act to confine the stacks of chips against both vertical and horizontal movement in the chip holder when the cooperative fastening means in the top plate is engaged with the vertical fastener.

3. A chip holder comprising a generally horizontally disposed four pointed star shaped base, a plurality of vertically disposed posts having their lower ends mounted in said base, said posts arranged on the base to laterally confine individual stacks of chips, said post arrangement including a post on the outer end of each of the four points of the star shaped base, a post on each side of the diverging points of the star shaped base, and a post at each corner of a small square about the center of the base, whereby the base carries a stack of chips on each of the four points and a stack of chips at each crotch of the base between adjacent points, said base adjacent each stack of chips having notch means in the outer periphery thereof to facilitate easy removal of chips from the holder, a vertical fastener disposed centrally of the small square of posts having a lower portion secured in said base, a generally horizontally disposed top plate for said chip holder, cooperative fastening means secured in said top plate for engaging the upper end of the vertical fastener, said top plate being of less peripheral extent than the points of the base, all of said posts excepting those posts on the outer ends of the four points terminating beneath said top plate and said posts on the outer ends of the four points terminating at a position above the lower level of the top plate, whereby the combination of the top plate with the posts act to confine the stacks of chips against both vertical and horizontal movement in the chip holder when the cooperative fastening means in the top plate is engaged with the vertical fastener, and means holding decks of playing cards on the top of the top plate.

4. A chip holder as defined in claim 3 in which the means holding the decks of playing cards comprise a plurality of posts secured at their lower ends in the top of the top plate and arranged to define adjacent slots whereby each slot may carry and confine a deck of playing cards.

References Cited

UNITED STATES PATENTS

| | | | |
|---|---|---|---|
| D. 141,951 | 8/1945 | Smith | D34—5 |
| 617,478 | 1/1899 | Cohen | 211—49 |
| 739,209 | 9/1903 | Ocumpaugh | 211—49 X |
| 1,561,201 | 11/1925 | Wocel | 211—49 |
| 1,690,394 | 11/1928 | Belt | 211—49 X |
| 2,829,777 | 4/1958 | Berardinelli | 211—49 |

NILE C. BYERS, Jr., Primary Examiner